United States Patent
Yasui et al.

(10) Patent No.: US 9,611,905 B2
(45) Date of Patent: Apr. 4, 2017

(54) SELECTABLE ONE-WAY CLUTCH

(71) Applicant: TOYOTA JIDOSHA KABUSHIKI KAISHA, Toyota-shi, Aichi (JP)

(72) Inventors: Hiroki Yasui, Susono (JP); Hiroyuki Shioiri, Yokohama (JP); Hideaki Komada, Gotemba (JP); Hiroyuki Shibata, Odawara (JP); Yuki Kurosaki, Susono (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 15/176,385

(22) Filed: Jun. 8, 2016

(65) Prior Publication Data

US 2016/0363179 A1   Dec. 15, 2016

(30) Foreign Application Priority Data

Jun. 10, 2015  (JP) ................. 2015-117685

(51) Int. Cl.
  *F16D 43/00*  (2006.01)
  *F16D 47/04*  (2006.01)
  *F16D 41/12*  (2006.01)

(52) U.S. Cl.
  CPC ........... *F16D 47/04* (2013.01); *F16D 41/125* (2013.01)

(58) Field of Classification Search
  CPC .............................. F16D 47/04; F16D 41/125
  See application file for complete search history.

(56) References Cited

U.S. PATENT DOCUMENTS

| | | | |
|---|---|---|---|
| 4,050,560 A * | 9/1977 | Torstenfelt | F02C 7/36 192/103 F |
| 8,540,065 B2 * | 9/2013 | Samie | F16D 41/084 188/82.2 |
| 2010/0200358 A1 * | 8/2010 | Eisengruber | F16D 41/12 192/41 S |
| 2010/0252384 A1 * | 10/2010 | Eisengruber | F16D 41/125 192/35 |
| 2011/0183806 A1 * | 7/2011 | Wittkopp | F16D 7/028 475/263 |
| 2012/0103747 A1 * | 5/2012 | Bird | F16D 41/125 192/46 |
| 2012/0165146 A1 * | 6/2012 | Samie | F16D 25/0638 475/5 |

FOREIGN PATENT DOCUMENTS

| | | |
|---|---|---|
| JP | 2002-340137 A | 11/2002 |
| JP | 2003-021220 A | 1/2003 |

* cited by examiner

*Primary Examiner* — David J Hlavka
(74) *Attorney, Agent, or Firm* — Andrews Kurth Kenyon LLP

(57) ABSTRACT

A selectable one-way clutch that can limit damage on components in an overrunning mode is provided. The selectable one-way clutch comprises a shutter plate arranged in a notch plate. The shutter plate is moved radially outwardly by a centrifugal force resulting from a rotation of the notch plate to prevent an entrance of the leading end of a strut into a notch.

3 Claims, 7 Drawing Sheets

SELECTABLE ONE-WAY CLUTCH

The present invention claims the benefit of Japanese Patent Application No. 2015-117685 filed on Jun. 10, 2015 with the Japanese Patent Office, the disclosure of which is incorporated herein by reference in its entirety.

BACKGROUND

Field of the Invention

Preferred embodiment of the present application relates to the art of a selectable one-way clutch adapted to selectively enable torque transmission only in one direction and to interrupt torque transmission in both directions.

Discussion of the Related Art

In the conventional one-way clutch, a selector plate is interposed between a pocket plate and a notch plate, and an operating mode of the one-way clutch is switched between an engagement mode and a disengagement mode by rotating the selector plate. For example, JP-A-2003-021220 and JP-A-2002-340137 individually describe a one-way clutch having a notch plate, a stator and a slide plate. According to the teachings of those prior art documents, struts are brought into engagement to notches by operating the slide plate.

In the conventional selectable one-way clutch, an engagement wall of each notch of a notch plate is individually brought into contact to a leading end of each strut held in pockets of a pocket plate by rotating the notch plate in a direction toward the leading end of the strut. Consequently, the selectable one-way clutch is brought into an engagement mode to enable torque transmission between the notch plate and the pocket plate though the struts. By contrast, the notch plate is allowed to rotate in the opposite direction, that is, in the overrunning direction without transmitting torque to the pocket plate. In this situation, however, an upper face of each strut individually pushed up by a spring is repeatedly brought into contact to an opening edge of each notch of the notch plate. In the conventional selectable one-way clutch, therefore, the struts and the notch plate may be damaged especially when the notch plate is rotated at a high speed. For example, the damage on the notch plate may be limited by reducing a number of struts. In this case, however, each backlash between the struts is individually increased and hence an impact caused by bringing the strut into engagement with the notch may be increased and hence parts of a transaxle may be damaged.

SUMMARY

Aspects of preferred example has been conceived noting the foregoing technical problems, and it is therefore an object of the preferred example is to provide a selectable one-way clutch that can limit damage on components by preventing a repeat of contact between the strut and the notch plate while the notch plate is rotated in an overrunning direction.

Preferred embodiment relates to a selectable one-way clutch, comprising: a first plate and a second plate opposed to each other while being allowed to rotate relatively with each other; a strut that is arranged on the first plate in a pivotal manner; a notch that is formed on the second plate; a first elastic member that pushes the leading end of the strut toward the notch to bring the strut into engagement with an engagement wall of the notch when the second plate is rotated in a predetermined direction; and an opening edge formed in the notch that pushes the strut out of the notch when the second plate is rotated in an opposite direction to the predetermined direction. In order to achieve the above-explained objective, according to the preferred embodiment of the present application, the selectable one-way clutch is provided with: a shutter plate that is arranged in the second plate while being allowed to move radially outwardly to close the notch and radially inwardly to open the notch; and a second elastic member that pushes the shutter plate radially inwardly to open the notch. Specifically, the shutter plate is adapted to be moved radially outwardly when an elastic force of the second elastic member is overwhelmed by a centrifugal force resulting from a rotation of the second plate so as to prevent an entrance of the leading end of the strut into the notch.

In a non-limiting embodiment, the selectable one-way clutch may be further provided with a guide groove holding the shutter plate in such a manner that the shutter plate is allowed to move in the radial direction.

In a non-limiting embodiment, the selectable one-way clutch may be further provided with: a third plate that is interposed between the first plate and the second plate while being allowed to rotate within a predetermined angle around a common rotational axis of the first plate and the second plate; and an aperture that is formed on the third plate to let through the strut toward the second plate. In addition, an operating mode of the selectable one-way clutch is switched by rotating the third plate between an engagement mode in which the leading end of the strut is brought into engagement with the engagement wall of the notch through the aperture, and a disengagement mode in which the strut is brought into disengagement from the engagement wall of the notch by the aperture.

As described, the selectable one-way clutch according to the preferred embodiment comprises the first plate, the second plate, and the third plated interposed between the first plate and the second plate. The operating mode of the selectable one-way clutch is switched by rotating the third plate between the engagement mode in which torque transmission is enabled in one direction and the disengagement mode in which a relative rotation of the selectable one-way clutch is allowed in both directions. If the second plate is rotated at a speed higher than a predetermined speed in an overrunning direction and hence an elastic force of the elastic force of the second elastic member is overwhelmed by a centrifugal force acting on the shutter plate, the notch of the second plate is closed by the shutter plate. According to the preferred embodiment, therefore, components of the selectable one-way clutch can be prevented from being damaged or worn even when the second plate is rotated in the overrunning direction at a high speed.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

Figure 1:
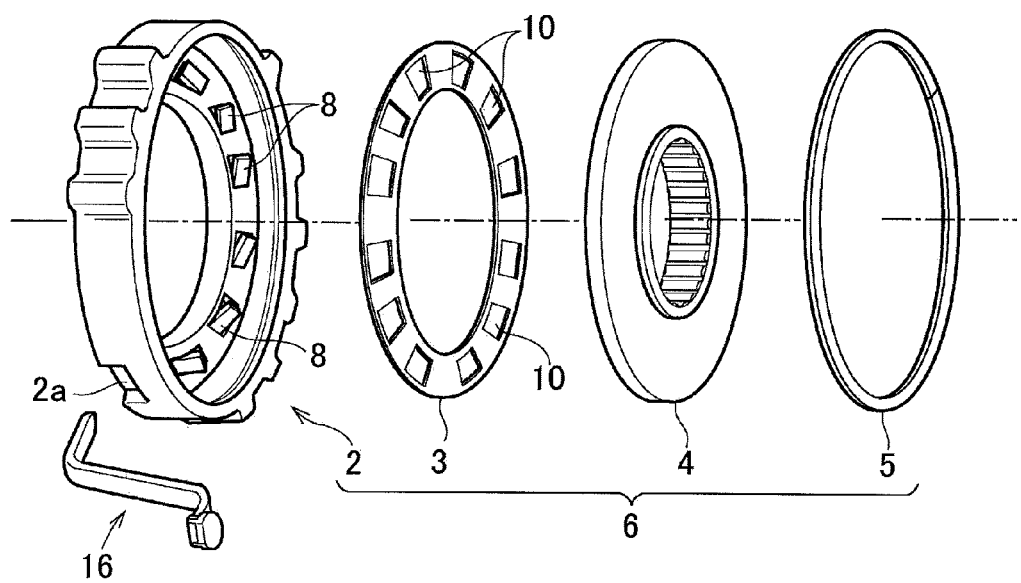
FIG. 1 is an exploded view of the selectable one-way clutch according to the preferred example.

Referring now to FIG. 1, there are shown each part of a body assembly 6 of a selectable one-way clutch (to be abbreviated as the "SOWC" hereinafter) 1 in detail. As shown in FIG. 1, the body assembly 6 of the SOWC 1 comprises a pocket plate 2 as a first plate, a selector plate 3 as a third plate, and a notch plate 4 as a second plate. The pocket plate 2 comprises an outer cylinder and an annular plate formed along an inner circumference of the cylinder. The selector plate 3 and the notch plate 4 are held in the cylinder in the order shown in FIG. 1, and a snap ring 5 is fitted into a clearance between an outer circumference of the notch plate 4 and an inner circumference of the cylinder of the pocket plate 2 to close the pocket plate 2.

Figure 2A:
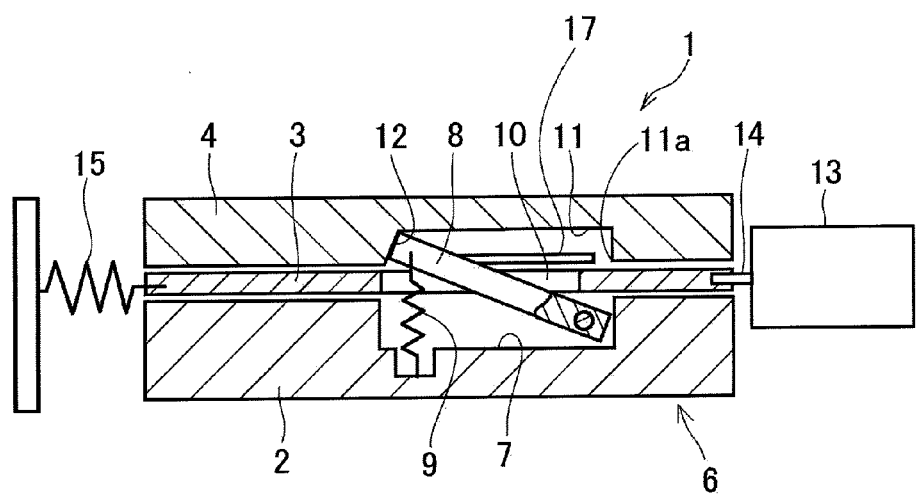
FIG. 2a is a partial cross-sectional view showing the selectable one-way clutch in engagement.
Figure 2B:
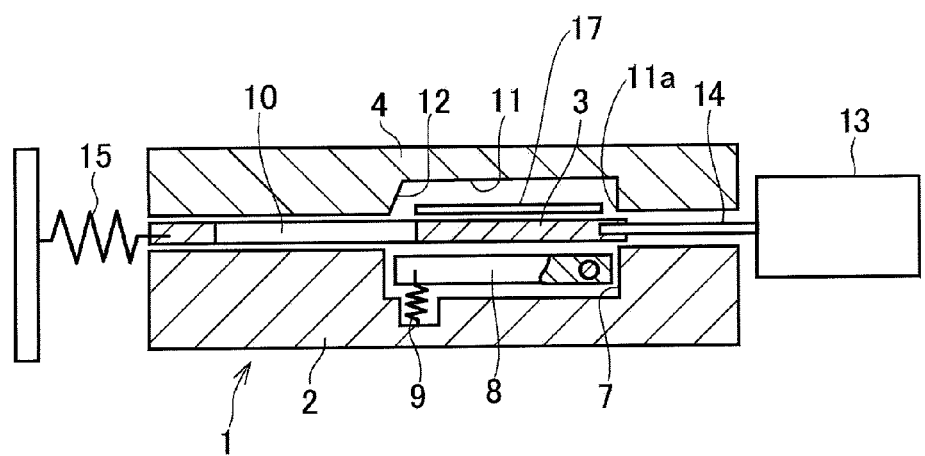
FIG. 2b is a partial cross-sectional view showing the selectable one-way clutch in disengagement.

Turning to FIGS. 2a and 2b, there is partially shown a cross-section of the SOWC 1 thus assembled. As illustrated in FIGS. 2a and 2b, a plurality of pockets (or depressions) 7 are formed in a circular manner on a face of the annular plate of the pocket plate 2 being opposed to the notch plate 4, and a rectangular strut 8 is individually held in each pocket 7 in a pivotal manner around one end thereof as a fulcrum. In order to push up the other end (to be called the "leading end" hereinafter) of the strut 8 toward the notch plate 5, a spring 9 as a first elastic member is interposed between the leading end of the strut 8 and a bottom of the pocket 7.

The selector plate 3 is an annular member having similar dimensions as the annular plate of the pocket plate 2, and apertures 10 are formed on the selector plate 3 in a circular manner and in a same number as the pockets 7. As shown in FIG. 2a, when the selector plate 3 is rotated at a predetermined angle in the pocket plate 2 to an engagement position where the apertures 10 are individually overlapped with each of the pockets 7, the leading end of each strut 8 is allowed to be pushed up by the spring 9 to be brought into engagement with a notch 11 of the notch plate 4. By contrast, when the selector plate 3 is rotated to a disengagement position where the apertures 10 are individually displaced from each of the pockets 7, each strut 8 is pushed into the pocket 7 by the selector plate 3 as shown in FIG. 2b.

The notch plate 4 is also an annular member, and the notches 11 are formed on a face of the notch plate 4 facing to the pocket plate 2 in a circular manner and in the same number as the pockets 7. When the leading end of the strut 8 is pushed into the notch 11 through the aperture 10, the leading end of the strut 8 is brought into abutment to an engagement wall 12 of the notch 11.

In order to rotate the selector plate 3 between the positions shown in FIGS. 2a and 2b, the SOWC 1 is provided with an actuator 13. The actuator 13 comprises a plunger 14 that is actuated lineally by an electromagnetic force or a hydraulic pressure. According to the example shown in FIGS. 2a and 2b, a solenoid actuator is employed as the actuator 13, and the plunger 14 is constantly pushed by a spring 15. That is, the plunger 14 is elastically pushed out of the actuator 13 by the spring 15 by stopping current supply to the actuator 13 to rotate the selector plate 3 to the disengagement position shown in FIG. 2b. By contrast, the plunger 14 is pulled into the actuator 13 against the elastic force of the spring 15 by energizing the actuator 13 to rotate the selector plate 3 to the engagement position shown in FIG. 2a. Here, it is to be noted that FIGS. 2a and 2b are merely schematic illustrations for explaining a principle of rotating the selector plate 3 by the actuator 13, therefore, an actual structure connecting the actuator 13 and the selector plate 3 is different from that shown in FIGS. 2a and 2b. Specifically, as described later, the spring 15 is fitted onto the plunger 14 in such a manner to push a leading end of the plunger 14.

Turning back to FIG. 1, the selector plate 3 and the actuator 13 are connected through an arm 16. Specifically, as illustrated in FIG. 1, the arm 16 is a cranked rod member. One of the end portions of the arm 16 is inserted into a through hole 2a of the pocket plate 2 from outside to be connected to the selector plate 3 in such a manner to be rotated integrally therewith. An intermediate portion of the arm 16 is bent to extend parallel to the cylinder of the pocket plate 2, and the other end of the arm 16 is bent radially outwardly at a point further than the cylinder of the pocket plate 2.

Figure 3:
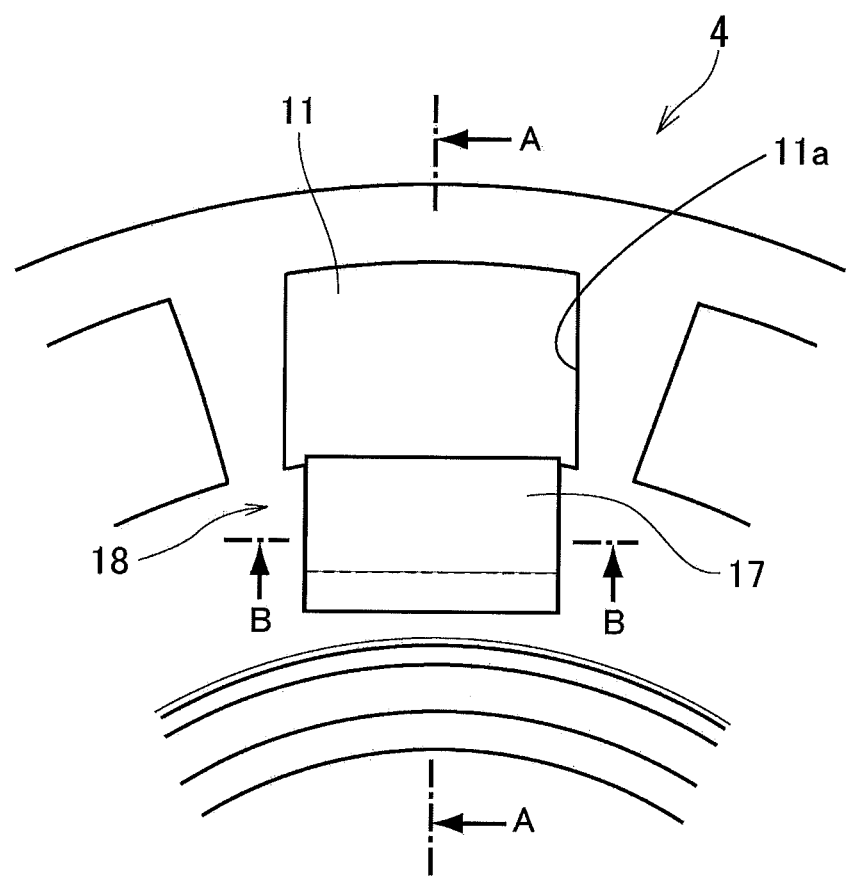
FIG. 3 is a front view showing the selectable one-way clutch according to the preferred embodiment.
Figure 4:
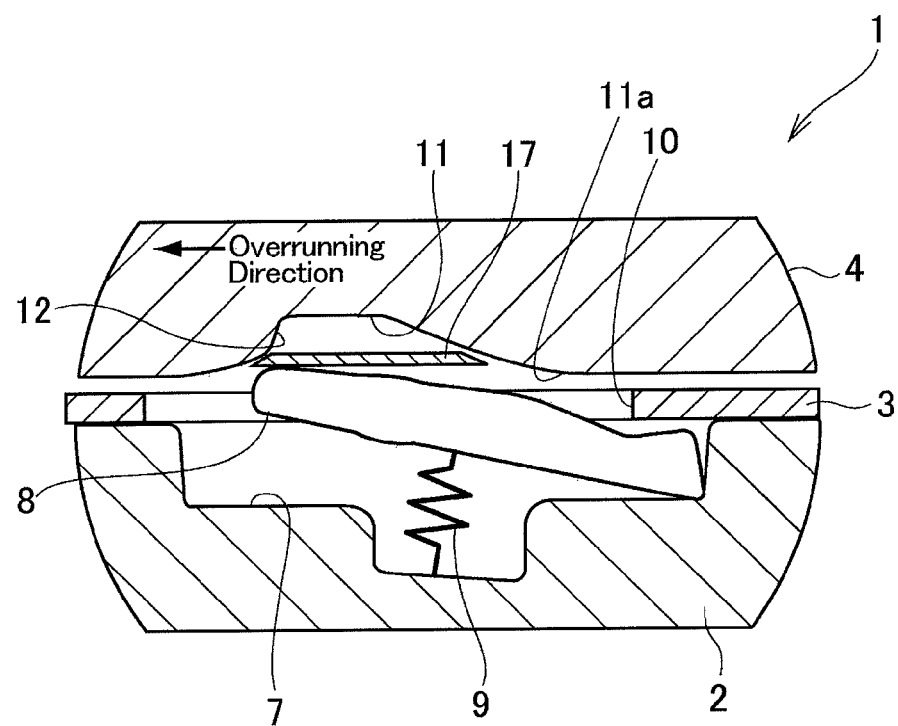
FIG. 4 is a schematic illustration showing a principle of action of the selectable one-way clutch.
Figure 5A:
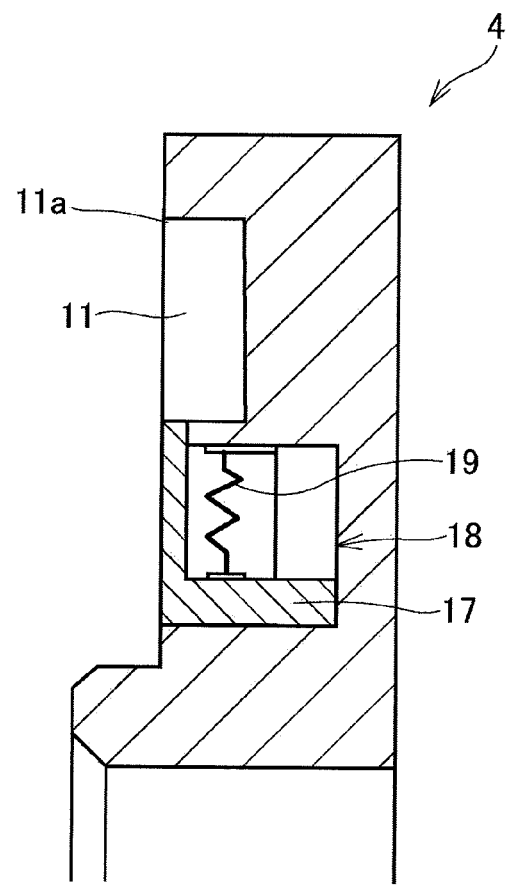
FIG. 5a is a cross-sectional view of the selectable one-way clutch along A-A line in FIG. 3.
Figure 5B:
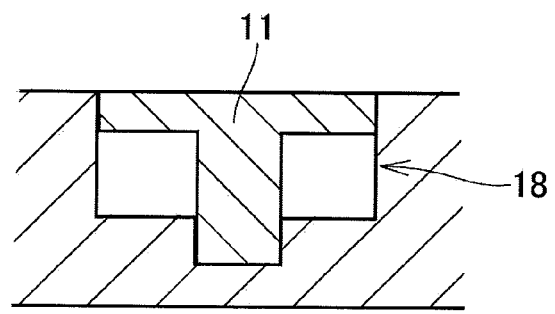
FIG. 5b is a cross-sectional view of the selectable one-way clutch along B-B line in FIG. 3.
Figure 6:
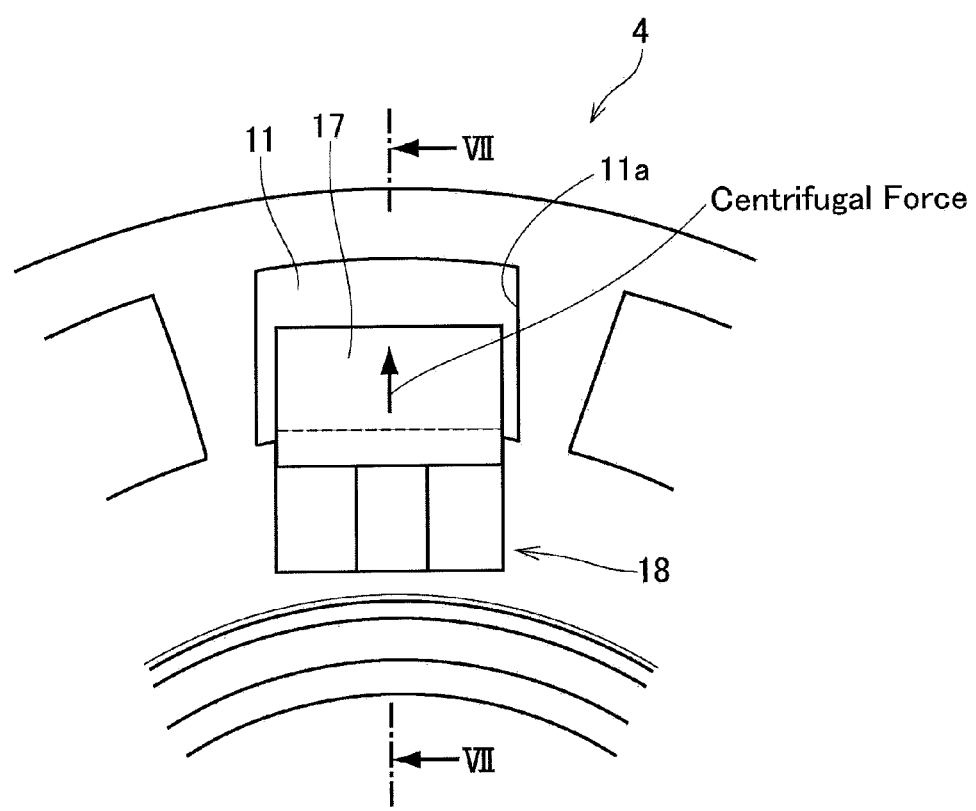
FIG. 6 is a front view showing the selectable one-way clutch according to another embodiment.
Figure 7:
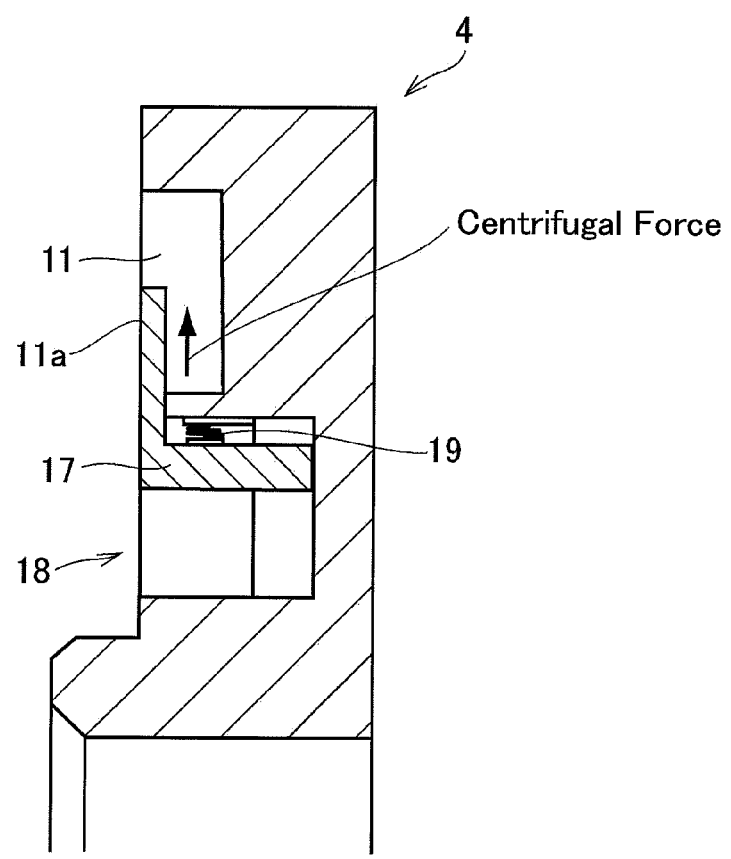
FIG. 7 is a cross-sectional view of the selectable one-way clutch along VII-VII line in FIG. 6.

The notch plate 4 is provided with a shutter plate 17 that selectively closes the notch 11, and a guide groove 18 holding the shutter plate 17 in such a manner that the shutter plate 17 is allowed to move in a radial direction. Specifically, a width of the shutter plate 17 is substantially identical to or slightly narrower than that of an opening edge 11a of the notch 11, and the shutter plate 17 is moved radially outwardly by a centrifugal force. As shown in FIGS. 3, 5a and 5b, when the notch plate 4 is rotated at a speed lower than a predetermined speed, the shutter plate 17 is held in the guide groove 18. By contrast, when the notch plate 4 is rotated at a speed higher than a predetermined speed, the shutter plate 17 is moved radially outwardly to close the notch 11 to prevent the strut 8 from being pushed up by the spring 9 as shown in FIGS. 6 and 7. Thus, each of the shutter plate 17 is rotated together with the notch plate 4, and if the rotational speed of the notch plate 4 is higher than the predetermined speed, each of the shutter plate 17 is centrifugally displaced radially outwardly to close the notch 11 to prevent the entrance of the leading end of the strut 8 into the notch 11.

The notch plate 4 is further provided with an elastic member 19 as a second elastic member pushing the shutter plate 17 radially inwardly toward the guide groove 18. That is, an elastic force of the elastic member 19 counteracts against the centrifugal force applied to the shutter plate 17. Specifically, when the rotational speed of the notch plate 4 is relatively low and hence the centrifugal force acting on the shutter plate 17 is weaker than the elastic force of the elastic member 19, the shutter plate 17 is pushed into the guide groove 18 by the elastic member 19 as shown in FIGS. 3 and 5a. By contrast, when the rotational speed of the notch plate 4 is relatively high and hence the elastic force of the elastic member 19 is overwhelmed by the centrifugal force acting on the shutter plate 17, the shutter plate 17 is displaced out of the guide groove 18 to close the notch 11 as shown in FIGS. 6 and 7. Thus, the shutter plate 17 pushed into the guide groove 18 by the elastic force to open the notch 11, and displaced out of the guide groove 18 to close the notch 11 by the centrifugal force. Here, it is to be noted that the notch 11 may be closed not only completely but also partially by the shutter plate 17.

Here will be explained an action of the SOWC 1 according to the preferred embodiment. As described, an operating mode of the SOWC 1 is switched between the engagement mode and the disengagement mode by the actuator 13. Specifically, the SOWC 1 is brought into the disengagement mode by inactivating the actuator 13. In this situation, the plunger 14 is pushed out of the actuator 13 by the return spring 15. Consequently, the selector plate 3 is rotated at a predetermined angle so that the apertures 10 of the selector plate 3 are individually displaced from the pockets 7 of the pocket plate 2 while pushing the struts 8 into the pockets 7. That is, the selector plate 3 is rotated to the disengagement position so that the notch plate 4 is brought into disengagement from the pocket plate 2. In this situation, therefore, the notch plate 4 is allowed to rotate relatively with respect to the pocket plate 2 in both directions.

When the actuator 13 is energized, the plunger 14 is pulled into the actuator 13 by an electromagnetic force against the elastic force of the return spring 15. Consequently, the selector plate 3 is rotated to the engagement position at which the apertures 10 are individually overlapped with the pockets 7 and hence the leading end of each of the strut 8 is individually pushed into the notch 11 by the spring 9. In this situation, if the notch plate 4 is rotated in the direction toward the leading end of the strut 8, the engagement wall 12 of each of the notch 11 is individually brought into contact to the leading end of the strut 8 to enable torque transmission between the pocket plate 2 and the notch plate 4 through the struts 8.

By contrast, if the notch plate 4 is rotated in the direction away from the leading end of the strut 8, each of the strut 8 is individually pushed into the pocket 7 by the opening edge 11a of the notch 11 to be brought into disengagement from the notch 11. In this case, therefore, the SOWC 1 is brought into an overrunning mode in which the notch plate 4 is allowed to rotate in this direction. However, while the notch plate 4 is rotated in the overrunning direction, the leading end of the strut 8 being pushed up by the spring 9 is repeatedly brought into contact to the opening edge 11a of the notch 11. As a result, the strut 8 and the notch plate 4 may be damaged or worn especially when the notch plate 4 is rotated at a high speed.

In order to limit damage on the components of the SOWC 1, according to the preferred embodiment, the shutter plate 17 closes the notch 11 when the notch plate 4 is rotated at a high speed. According to the preferred embodiment, therefore, the strut 8 will not be damaged by the opening edge 11a of the notch 11 even if the notch plate 4 is rotated in the overrunning direction. Specifically, when the notch plate 4 is rotated at a speed higher than the predetermined speed and hence the elastic force of the elastic member 19 is overwhelmed by the centrifugal force acting on the shutter plate 17, the shutter plate 17 is moved radially outwardly to close the notch 11. In this situation, therefore, the strut 8 can be prevented from being pushed into the notch 11 by the spring 9, and hence the strut 8 will not be damaged repeatedly by the opening edge 11a of the notch 11 even if the notch plate 4 is rotated in the overrunning direction. By contrast, when the notch plate 4 is rotated in the overrunning direction at a speed lower than the predetermined speed and hence the centrifugal force acting on the shutter plate 17 is weaker than the elastic force of the elastic member 19, the shutter plate 17 is pushed into the guide groove 18 by the elastic member 19. In this situation, the notch 11 is opened so that the leading end of the strut 8 is repeatedly pushed into the notch 11 by the spring 9 and pushed into the pocket 7 by the opening edge 11a of the notch 11. However, since the rotational speed of the notch plate 4 is low, the strut 8 will not be damaged significantly by the opening edge 11a of the notch 11, and impact noise caused by the repetition of contact between the struts 8 and the opening edge 11a of the notch 11 is not so loud.

Thus, according to the preferred embodiment, the struts 8 can be prevented from being brought into contact to the opening edge 11a of the notch 11 when the notch plate 4 is rotated at a high speed in the overrunning direction. According to the preferred embodiment, therefore, damage on the struts 8 and the notch plate 4 can be limited. In addition, it is not necessary to reduce the number of the struts 8 and the notches 11 to limit damage thereon, each backlash between the struts 8 and the notches 11 will not be elongated. According to the preferred embodiment, therefore, damage on the struts 8 and the notch plate 4 can be further limited.

Although the above exemplary embodiment of the present application have been described, it will be understood by those skilled in the art that the present application should not be limited to the described exemplary embodiment, and various changes and modifications can be made within the spirit and scope of the present application. For example, number of the shutter plate 17 may be altered according to need.

What is claimed is:

1. A selectable one-way clutch, comprising:
    a first plate and a second plate opposed to each other while being allowed to rotate relatively with each other;
    a strut that is arranged on the first plate in a pivotal manner;
    a notch that is formed on the second plate;
    a first elastic member that pushes a leading end of the strut toward the notch to bring the strut into engagement with an engagement wall of the notch when the second plate is rotated in a predetermined direction;
    an opening edge formed in the notch that pushes the strut out of the notch when the second plate is rotated in an opposite direction to the predetermined direction;
    a shutter plate that is arranged in the second plate while being allowed to move radially outwardly to close the notch and radially inwardly to open the notch; and
    a second elastic member that pushes the shutter plate radially inwardly to open the notch;
    wherein the shutter plate is adapted to be moved radially outwardly when an elastic force of the second elastic member is overwhelmed by a centrifugal force resulting from a rotation of the second plate so as to prevent an entrance of the leading end of the strut into the notch.

2. The selectable one-way clutch as claimed in claim 1, further comprising:
    a guide groove holding the shutter plate in such a manner that the shutter plate is allowed to move in the radial direction.

3. The selectable one-way clutch as claimed in claim 1, further comprising:
    a third plate that is interposed between the first plate and the second plate while being allowed to rotate within a predetermined angle around a common rotational axis of the first plate and the second plate; and
    an aperture that is formed on the third plate to let through the strut toward the second plate;
    wherein an operating mode of the selectable one-way clutch is switched by rotating the third plate between an engagement mode in which the leading end of the strut is brought into engagement with the engagement wall of the notch through the aperture, and a disengagement mode in which the strut is brought into disengagement from the engagement wall of the notch by the aperture.

* * * * *